US00RE36298E

United States Patent [19]

Scherrer et al.

[11] E Patent Number: Re. 36,298

[45] Reissued Date of Patent: Sep. 14, 1999

[54] VEHICLE

[75] Inventors: Richard Scherrer, Nordland, Wash.; Denys D. Overholser, Carson City, Nev.; Kenneth E. Watson, No. Hollywood, Calif.

[73] Assignee: Lockheed Martin Corporation, Bethesda, Md.

[21] Appl. No.: 08/539,789

[22] Filed: Oct. 5, 1995

Related U.S. Patent Documents

Reissue of:

[64] Patent No.: 5,250,950
Issued: Oct. 5, 1993
Appl. No.: 06/011,769
Filed: Feb. 13, 1979

[51] Int. Cl.[6] ..... H01Q 17/00

[52] U.S. Cl. ..... 342/2; 342/3; 342/13; 342/4

[58] Field of Search ..... 342/2, 4, 13, 1, 342/3, 5, 6; D12/12, 82, 300, 319, 333; 244/119, 120, 121, 123, 124, 125, 126, 129.1, 133, 15, 36; 114/15; 367/1

[56] References Cited

U.S. PATENT DOCUMENTS

| | | | |
|---|---|---|---|
| D. 52,066 | 5/1918 | Stout | D12/319 |
| D. 134,182 | 6/1942 | Wagner | 244/13 |

(List continued on next page.)

FOREIGN PATENT DOCUMENTS

| | | |
|---|---|---|
| 1-277716 | 6/1991 | Japan . |
| 852881 | 11/1960 | United Kingdom . |
| 2 029 714 | 9/1978 | United Kingdom . |

OTHER PUBLICATIONS

Jackson, Jane's All the Worlds Aircraft, MBB Lampyridae, p. 109, Dec. 1995.

Dane, Popular Mechanics, America's Invisible Warship, Jul. 1993.

Aviation Week & Space Technology, "Northrop's 1976 Stealth Fighter Proposal", p. 23, Feb. 1992.

Sweetman et al, *Lockheed F–117A Operation and Development of the Stealth Fighter*, 1990 (including discussion of A–12 aircraft).

Lowry et al, Structural Concepts and Aerodynamic Analysis for Low Radar Cross Section (LRCS) Fuselage Configurations, Sikorsky Aircraft Division, United Technologies Corp. (Jul. 1978) pp. 1–42.

Jenkins et al, "Fundamentals of Optics", Fourth Edition, McGraw–Hill, Inc. Chapter 6.

Ben R. Rich & Leo Janos, "Skunk Works", Little Brown and Company, Copyright 1994, pp. 1–105.

F–117A Cost Performance and Contracts History, pp. 1–12, Ray Parson material supplied to Hallion, pp. 1–12.

Interview: Ben Rich on Stealth 1–2, pp. 1–9.

Interview with Denys Overholser, pp. 1–6.

Warren Gilmour's notes, letter dated Mar. 24, 1981.

Ben Rich—add stealth, pp. 1–6.

Modern LO Technology as Recalled by Warren Gilmour, pp. 1–2.

Pyotr Ufimtsev: "Godfather of Stealth", Academic Spotlight, p. 2.

P. Ya. Ufimtsev, "Method of Edge Waves in the Physical Theory of Diffraction", Foreign Technology Division, Wright–Patterson Air Force Base, Ohio, 1962, pp. 1–223.

(List continued on next page.)

*Primary Examiner*—Daniel T. Pihulic
*Attorney, Agent, or Firm*—Oblon, Spivak, McClelland, Maier & Neustadt, P.C.

[57] ABSTRACT

A vehicle in free space or air, with external surfaces primarily fashioned from planar facets. The planar facets or panels are angularly positioned to reduce scattered energy in the direction of the receiver. In particular, radar signals which strike the vehicle are primarily reflected at an angle away from the search radar or are returned to the receiver with large variations of amplitude over small vehicle attitude changes.

57 Claims, 3 Drawing Sheets

U.S. PATENT DOCUMENTS

| | | | |
|---|---|---|---|
| D. 172,465 | 8/1954 | Del Mar | D12/333 |
| D. 183,349 | 8/1958 | Johnson | D12/333 |
| D. 198,249 | 5/1964 | Sleeman, Jr. et al. | D12/335 |
| D. 199,104 | 9/1964 | Sleeman, Jr. et al. | D12/335 |
| D. 205,169 | 6/1966 | Petry | D12/319 |
| D. 212,720 | 11/1968 | Petry | D12/331 |
| D. 220,589 | 4/1971 | Richitelli | D12/328 |
| D. 238,483 | 1/1976 | Swanson | D12/338 |
| D. 244,265 | 5/1977 | Opfer | D12/333 |
| D. 254,903 | 5/1980 | Holmen et al. | D12/342 |
| D. 278,700 | 5/1985 | Powers et al. | D12/342 |
| D. 305,325 | 1/1990 | Andrews | D12/331 |
| D. 306,997 | 4/1990 | Andrews | D12/331 |
| D. 308,043 | 5/1990 | Butler | D12/331 |
| D. 332,080 | 12/1992 | Sandusky, Jr. et al. | 342/2 |
| D. 356,900 | 4/1995 | Weir et al. | D12/331 |
| 1,936,786 | 11/1933 | Gebhert | 244/5 |
| 2,527,918 | 10/1950 | Collard | 342/2 |
| 2,998,947 | 9/1961 | Griffith | 244/117 R |
| 3,427,619 | 2/1969 | Wesch et al. | 342/3 |
| 3,432,609 | 3/1969 | Duvall et al. | 342/5 |
| 3,487,410 | 12/1969 | Barnett et al. | 342/2 |
| 3,509,568 | 4/1970 | Mannig et al. | 342/2 |
| 3,625,459 | 12/1971 | Brown | 244/35 R |
| 3,719,244 | 3/1973 | Miller et al. | 296/164 |
| 3,756,540 | 9/1973 | Williams | 244/35 R |
| 3,838,425 | 9/1974 | Ishimitsu et al. | 342/2 |
| 3,997,899 | 12/1976 | Rolsma | 342/2 |
| 4,019,699 | 4/1977 | Wintersdorf et al. | 342/2 |
| 4,030,098 | 6/1977 | Nahmias | 342/2 |
| 4,115,775 | 9/1978 | Harrington | 342/5 |
| 4,148,032 | 4/1979 | Kelly et al. | 342/2 |
| 4,327,884 | 5/1982 | Lawhorn | 244/3.1 |
| 4,354,646 | 10/1982 | Raymer | 244/87 |
| 4,501,784 | 2/1985 | Moshinsky | 342/13 |
| 4,700,190 | 10/1987 | Harrington | 342/2 |
| 4,924,228 | 5/1990 | Novak et al. | 342/2 |
| 4,990,923 | 2/1991 | Delfeld | 342/4 |
| 5,014,060 | 5/1991 | Novak et al. | 342/2 |
| 5,016,015 | 5/1991 | Novak et al. | 342/2 |
| 5,063,384 | 11/1991 | Novak et al. | 342/1 |
| 5,128,678 | 7/1992 | Novak et al. | 342/2 |
| 5,150,122 | 9/1992 | Bell | 342/8 |
| 5,276,447 | 1/1994 | Shingo | 342/2 |
| 5,415,364 | 5/1995 | Grant | 244/17.11 |
| 5,420,588 | 5/1995 | Bushman | 342/2 |
| 5,488,372 | 1/1996 | Fischer | 342/5 |

OTHER PUBLICATIONS

A. Golden, Jr., "Radar Electronic Warfare", *AIAA Education Series*, American Institute of Aeronautics and Astronautics, Inc., pp. 106–119.

Knott et al., "Radar Cross Section" 2nd Edition, 1993 Artech House, Inc., pp. 269–295.

A.K. Bhattacharyya et al., "Radar Cross Section Analysis and Control" 1991 Artech House, Inc., pp. 234–239.

W.D. Burnside et al, "Axial–radar cross section of finite cones by the equivalent–current concept with higher–order diffraction", Radio Science, vol. 7, No. 10, pp. 943–948, Oct. 1972.

G. T. Ruck et al, "Radar Cross Section Handbook", vol. 2, Library of Congress Catalog Card no. 68–26774, pp. 473–537.

F.N. Bradley, "Radar Cross Section of Flat Base Dielectric Cones", Bradley and Eastly: RCS of Dielectric Cones, pp. 1123–1125 (1965).

J.W. Crispin, Jr., et al, "Radar Cross–Section Estimation for Complex Shapes", Proceedings of the IEEE, Aug., pp. 972–982.

J.W. Crispin, Jr., et al, "Radar Cross–Section Estimation for Simple Shapes", Proceedings of the IEEE, pp. 833–848 (Aug. 1965).

Muchmore, "Aircraft Scintillation Spectra", IRE Transactions on Antennas and Propagation, pp. 201–212, (Mar. 1960).

R. B. Watson et al, "On the Diffraction of a Radar Wave by a Conducting Wedge", Journal of Applied Physics, vol. 21, Aug., 1950, pp. 802–804.

B. Sweetman, "Stealth Aircraft", Library of Congress Cataloging–in–Publication Date, pp. 4–96, (1986).

M. Dornheim, "Fly–by–Wire Controls Key To 'Pure' Stealth Aircraft", Aviation Week & Space Technology/Apr. 9, 1990, pp. 36–41.

"Future Strategic Manned Bomber Plan", Special Report, Aviation Week & Space Technology, Jun. 16, 1980, pp. 137–141.

E.B. Cole, Jr., "Airplane Models Reveal", Electronics, Jan. 1995, pp. 122–125.

T.P. Basserot, "The jet Fighter Radar Cross Section", IEEE Transaction on Aerospace and Electronics Systems, vol. AES–11, No. 4, Jul. 1975, pp. 523–533.

The Engineering Index Annual—1977 Abstract No. 069687, p. 5318.

J.H. Richmond, A Computer Program For Physical–Optics Scattering by Convex Conducting Targets—2430–7, May 1968, pp. 1–41.

J.H. Richmond, A Computer Program For Physical–Optics Scattering By Convex Conducting Bodies, Technical Report 2097–7 Feb. 16, 1967, p. 12.

"U.S. Companies Target Emerging Market For Dismantling CIS Nuclear Arsenal", Aviation Week & Space Technology/ Feb. 10, 1992, p. 23.

"Popular Science", article, *What's New*, Stealthy Ship, p. 14, Oct. 1995.

Shearman et al, "Radar Development to 1945" *IEE Radar, Sonar, Navigation and Avionics Series 2*, pp. 473–477.

J. Jones, "Stealth Technology The Art of Black Magic", AERO, pp. 1–149.

A.K. Marsh, "Stealth and Future Military Aircraft", *Military Avionics*, pp. 1–42.

FIG. 1
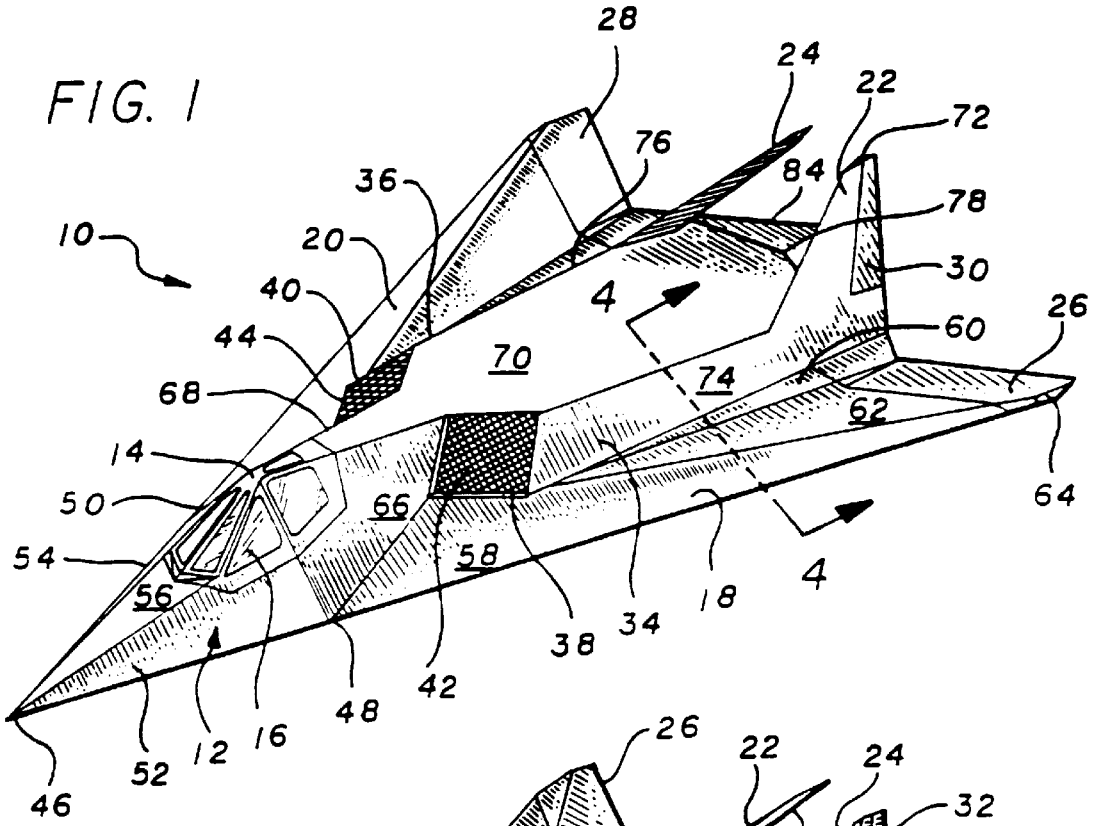
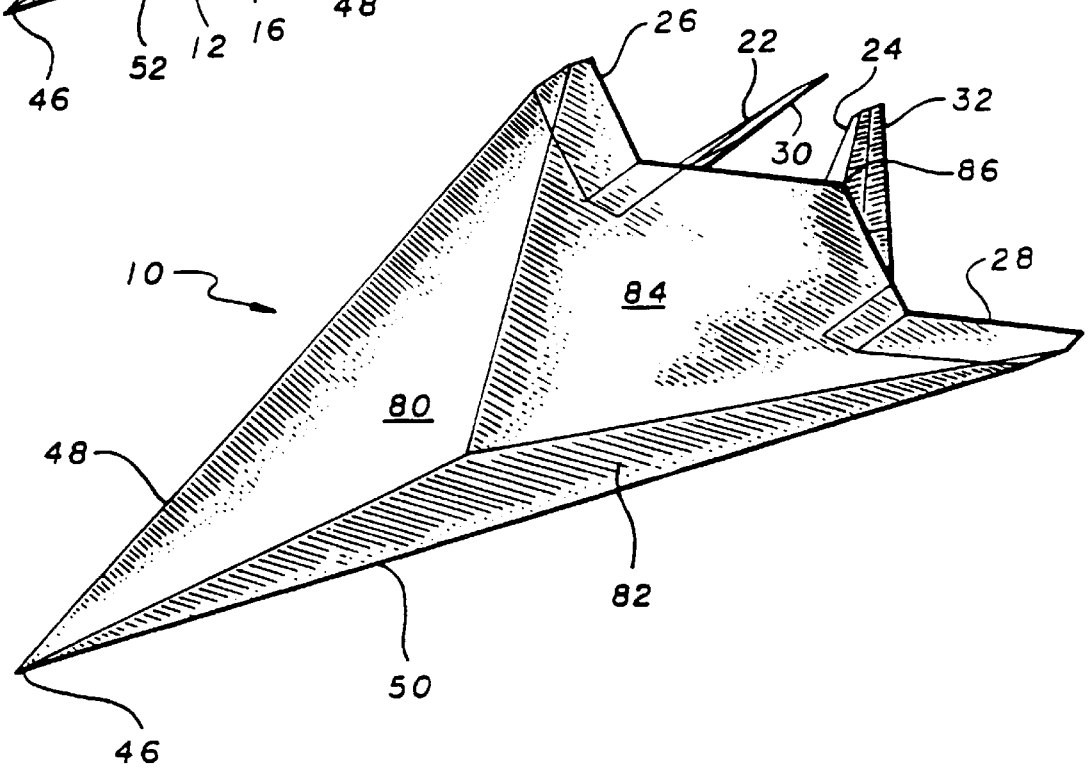
FIG. 2

FIG. 5
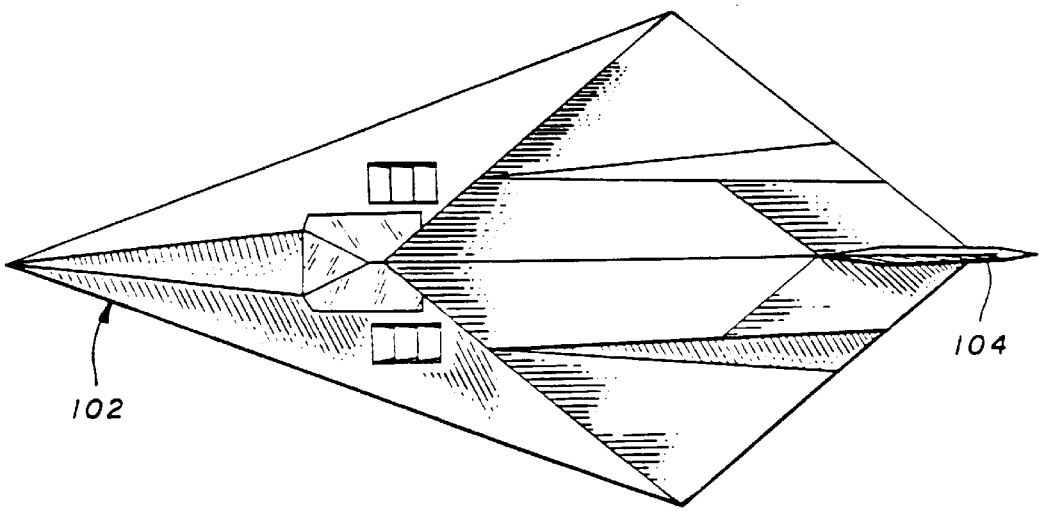
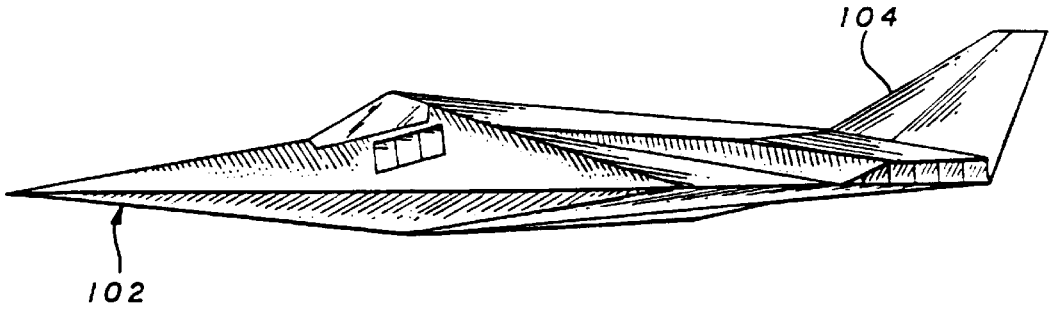
FIG. 6

VEHICLE

Matter enclosed in heavy brackets [ ] appears in the original patent but forms no part of this reissue specification; matter printed in italics indicates the additions made by reissue.

TECHNICAL FIELD

The invention relates to the field of airborne vehicles or vehicles in free space and in particular, to vehicles configured to have a minimal radar cross section.

BACKGROUND OF PRIOR ART

When vehicles operate over enemy territory they are often, if not continuously, subjected to illumination by electromagnetic radiation, such as radar, the enemy objectives being the detection, location and destruction of such vehicles at the earliest possible moment.

Stealth vehicles of the prior art, while often being treated with antireflective coatings in an effort to reduce their vulnerability to detection, have nevertheless remained relatively detectable. This detectability is an inherent characteristic of the vehicle shape and, since vehicle shape has usually been determined by design criteria other than stealth, large radar cross sections result. Thus due to improperly shaped vehicles, radar cross section reduction has been only marginally successful. The success of such vehicles penetrating enemy territory can be significantly enhanced if radar detection ranges can be shortened or eliminated by reducing radar cross section which in turn reduces the signal at the radar receiver.

Accordingly, it is a general object of this invention to provide a vehicle whose external surfaces are configured to make such vehicles substantially invisible to radar by reducing the signal received below receiver sensitivity levels and/or clutter.

It is another object of the present invention to provide a vehicle whose surface configuration is designed so that search radar directed to detect its presence is provided with a response signal which has wide amplitude variation relative to vehicle attitude with respect to the illuminating radar.

It is a further object of the present invention to provide a vehicle having a substantial absence of curved surfaces in order to satisfy these objectives.

SUMMARY OF THE INVENTION

The desired stealth capability (i.e., low radar cross section is imparted to the vehicle of the invention through the use of a basic polyhedron shape, the respective surfaces of the vehicle being planar facets. These facets are arranged so as to present the illuminating source with high angles of incidence, thus causing the primary reflected power to be in a direction of forward scatter, i.e., away from the source. Thus, with the possible exception of minor regions, few rounded external surfaces exist on the vehicle. Facets and edges are also sometimes constructed partially or totally from, or are treated with, antireflective materials and surface current density control materials. The flat, facet surfaces, concentrate scattered energy primarily into a forward scatter direction, minimizing side lobe direction magnitudes. Thus, the tracking radar receives either small undetectable signals or only intermittent signals which interrupt continuous location and tracking ability. The desirable characteristics may be provided while also maintaining reasonable and adequate aerodynamic efficiency in the case of an airborne vehicle.

Particular attention is given to the sweep angles and break angles for this purpose, minimizing drag.

The novel features which are believed to be characteristic of this invention, both as to its organization and method of operation, such as reducing in a vehicle the power scattered per unit solid angle in the direction of an illuminating source receiver; scattering power primarily in directions other than toward the illuminator, enhancing scintillation with large amplitude variations; and shaping the vehicle such that its facets are arranged with high angles of incidence and appropriate edge boundaries to suppress scattered side lobes in the direction of the receiver *substantially independent of azimuth positioning of the receiver*. These features will be better understood from the following description in connection with the accompanying drawings in which a presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 1 is a top perspective view of a typical vehicle configured in accordance with the teachings of the present invention;

FIG. 2 is a bottom perspective view of the vehicle;

FIG. 5 is a top view of a second vehicle configured in accordance with the teachings of the present invention; and FIG. 6 is a side view of the second vehicle.

DETAILED DESCRIPTION OF THE PREFERRED EMBODIMENTS

Figure 3:
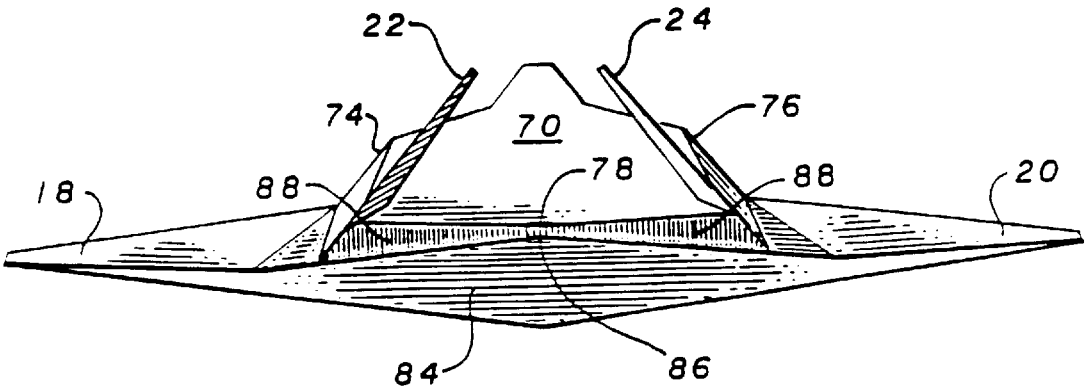
FIG. 3 is a rear view of the vehicle.
Figure 4:
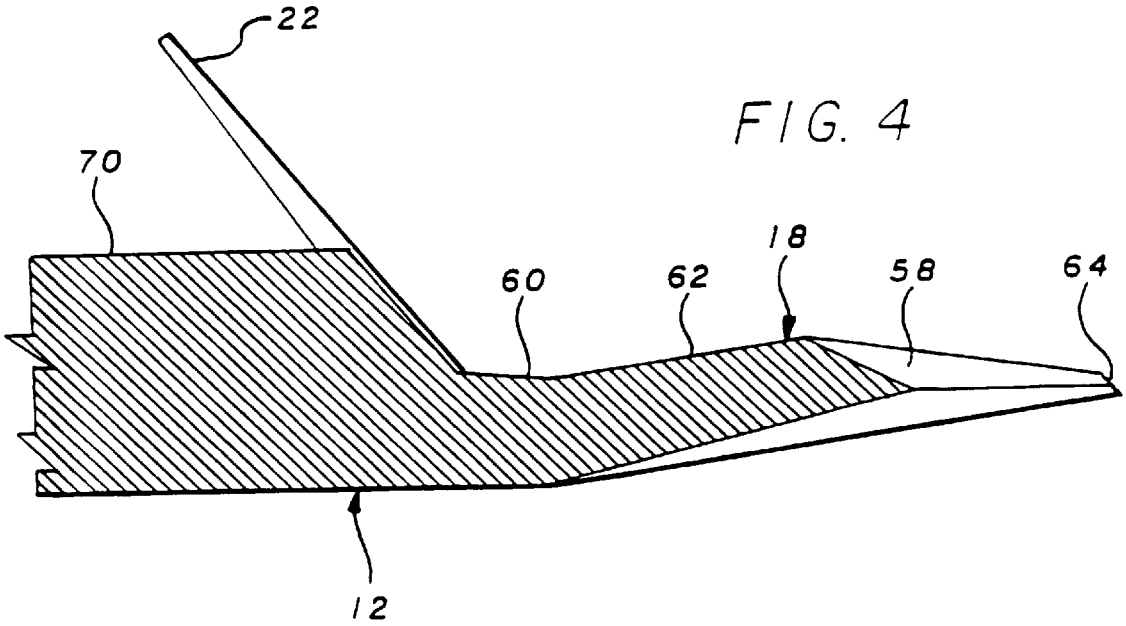
FIG. 4 is a sectional view of typical surfaces and surface junctions of the vehicle taken along line 4—4 of FIG. 1.

In FIGS. 1 through 4 a typical vehicle configuration designed and constructured in accordance with the teachings of the present invention is illustrated. The vehicle, indicated by the numeral 10, is shown to be generally polyhedron in shape and of a substantially delta-shaped configuration and includes a fuselage 12 having a cockpit region 14 with an appropriate windshield 16. The fuselage 12 structurally supports a pair of wings 18 and 20 which extend generally outwardly therefrom, preferably with a slight dihedral, substantially as shown in FIG. 3. Extending generally upward and inward from regions of intersection between the fuselage 12 and the wings 18 and 20 are a pair of "vertical" stabilizers 22 and 24. The inward tilt of the stabilizers 22 and 24 is considered to minimize radar cross section, since this configuration tends to hide, or mask, other elements. Movably affixed to the respective trailing edges or the wings 18 and 20 are [elevens] *elevons* 26 and 28 for vehicle control. Similarly attached for movement to the trailing regions of the vertical stabilizers 22 and 24 are a pair of rudders 30 and 32 for vehicle control. On the sides of the fuselage 12 are a pair of air inlet cowlings 34 and 36 for the aircraft propulsion system (not shown), having in their respective inlets 38 and 40 a pair of inlet grids 42 and 44. The nose 46 of the vehicle 10 is preferably pointed to the maximum practical extent, generally as illustrated. It will also be noted that the leading edges 48 and 50, in the preferred embodiment, are common to both the fuselage 12 and the respective wings 18 and 20. The edges 48 and 50 are usually made as sharp as can be accommodated structurally, as are each of the other external edges on the vehicle 10.

As previously mentioned, a primary feature of the invention is that the complete outward facing surface area of the vehicle 10, and each of its identified components, is characterized as being faceted. For example, as seen in FIG. 1, the upper portion of the nose section 46 comprises three flat surfaces, namely, side surfaces 52 and 54 and top surface 56. Similarly, the wing 18 includes a multiplicity of facets upon its upper surface, namely, a leading facet 58, an inner facet 60, a top facet 62 and an end facet 64. The wing 20 is constructed as a mirror image of wing 18, the facets not being identified. The rearward portion of the fuselage 12 includes side facets 66 and 68 and an upper rearward facet 70 connecting them. The windshield 16 is also constructed from a plurality of faceted segments which are not individually described. The cross section of the vertical stabilizers 22 and 24 is of generally diamond shape, as indicated at 72 in FIG. 1. The inlet cowlings 34 and 36 have side panels 74 and 76 angled inward and rearward, with the upper panels thereof coincident with upper rearward facet 70 which terminates at a point 78 at the rear of the vehicle 10.

The underside of the vehicle 10 is similarly constructed of a plurality of facets, the primary ones of which are the wing and fuselage facets 80 and 82. A bottom rearward facet 84 terminating at point 86 is connected to the facets 80 and 82, each being oriented at a discrete angle with respect to each of the others. The presence of a minimum number of large facets on the bottom surface of the vehicle 10 greatly enhances the low radar cross section of the vehicle 10. The exhaust port of the vehicle 10 is generally indicated by the numeral 88 and is shielded by facet 84 from radar and infrared detection by the extension of facet 84 beyond facet 70 and point 78.

Since the radar cross section normal to each edge is relatively high, it is desirable that the vehicle be designed with as few such edges as possible. It is also desirable that those edges which are included be oriented, as are the above described surfaces, to place higher cross section values into sectors where minimum radar cross section is not required.

Although it is not considered possible to totally eliminate the radar cross section of a flyable vehicle, it is possible with the vehicle of this configuration to so reduce or disguise its detectability that the cross section vulnerability to detection is insignificant.

It will be recognized that the surfaces, as described, can be customized for the vehicle mission, depending upon such factors as the vehicle altitude and azimuth from known radar installations. This can be accomplished by designing the angles of the various surfaces to provide minimum reflectivity under the conditions extant, with the radar cross section being determined by a computer. The vehicle can be further designed in relation to the anticipated direction of the threat, as, for example, from the ground or from the air or from the direction of the nose or tail, and whether the radar signals are expected to be high frequency or low frequency.

The angles of the tail surfaces, with an inward tilt therebetween, enhance the ability of the vehicle to display a minimum radar cross section while retaining the ability to function with reasonable aerodynamic efficiency.

It is sometimes desirable in designing this vehicle to further decrease any reflection of a radar signal by applying to some or all of its surfaces and some edges, radar absorber, such as are currently used on state-of-the-art insurgency vehicles. As little of such material as possible should be utilized, however, since it is heavy and, therefore, detrimental to the flight performance of the vehicle. Reflective surfaces such as engines, stores and the like normally found on aircraft, are either enclosed within the fuselage of the vehicle or are otherwise contained interiorly of the facets.

Since it is desirable, for the reasons discussed above, that the vehicle incorporate air inlets of highly canted configuration, a particular operational difficulty is encountered, i.e., the ability to capture a significant amount of air in a sharply canted engine air inlet, such inlet configurations being represented by the inlets 38 and 40. Grids capable of providing a high percentage of air capture, i.e., directing the air into the inlets 38 and 40 rather than permitting it to bypass those inlets as would be normal in configuration of this character, are represented by inlet grids 42 and 44.

Such inlet grids 42 and 44 also possess the desirable feature of having a low radar cross section.

A second embodiment of a low radar cross section, faceted vehicle is illustrated in FIGS. 5 and 6 and indicates the breadth and flexibility of designs which may be evolved utilizing the teachings of the present invention. In this embodiment, the vehicle 102 is provided with a single vertical stabilizer 104, much in the nature of a standard aircraft stabilizer. The vehicle 102 includes a multiplicity of facets, none of which are individually identified, but each of which is designed in accordance with the principles set forth with respect to the above-described vehicle 10. It will also be recognized that this vehicle may either be manned as a piloted vehicle, or that the cockpit region 26 identified with respect to vehicle 10 may be eliminated or that the vertical stabilizer 104 may be eliminated and replaced by a thrust vector control system such as used in missiles and spacecrafts. In such event, the vehicle is provided with appropriate radio controls or such other system as may be necessary to achieve its guidance.

Having thus described the invention, it is obvious that numerous modifications and departures may be made by those skilled in the art; thus, the invention is to be construed as being limited only by the spirit and scope of the appended claims.

INDUSTRIAL APPLICATION

The vehicle is useful in tactical endeavors where it is desired to keep detectability at a minimum.

We claim:

1. A vehicle including flight control means and propulsion means, comprising:

a fuselage and wings; and a plurality of surfaces defining the exterior of said fuselage and wings, said surfaces consisting of a series of facets.

2. The vehicle of claim 1 wherein substantially all of said facets lie in a different plane.

3. The vehicle of claim 1 wherein substantially the entire exterior of said vehicle comprises said facets.

4. The vehicle of claim 1 wherein said facets are angularly positioned to be least reflective of electromagnetic radiation in the direction of radiation detection devices.

5. The vehicle of claim 1 wherein said fuselage and wings include leading and trailing edges having a [relatively] sharp, [nonrounded] *non-rounded* configuration.

6. The vehicle of claim 5 wherein the leading edges of said fuselage and said wings are joined and continuous, beginning from a forwardmost point of said vehicle.

[7. The vehicle of claim 1 wherein the exterior of said vehicle consists of a minimum of said facets compatible with defining a vehicle capable of supporting aerodynamic flight.]

8. The vehicle of claim 1 wherein the bottom rearward facet of said vehicle extends beyond the exhaust port of said vehicle to provide electromagnetic and infrared shielding.

[9. The vehicle of claim 1 wherein the area of each of said facets is maximized compatible with defining a vehicle capable of supporting aerodynamic flight.]

10. The vehicle of claim 1 wherein at least a portion of said surfaces is treated with a radiation absorbing material.

11. The vehicle of claim 1 wherein each of said surfaces is treated with a radiation absorbing material to minimize, in combination with said facets, the reflection of radiation to detection apparatus.

12. The vehicle of claim 1 further comprising a substantially delta-shaped planform.

13. A vehicle including flight control means and propulsion means, comprising:

a fuselage;

a wing attached to and extending generally laterally outward from either side of said fuselage;

*at least one* tail [means] attached to and extending generally upward from said fuselage;

said fuselage, wing and *at least one* tail including a plurality of individually planar external surfaces oriented [to make said vehicle substantially invisible to tracking] *with high angles of incidence and edge boundaries which suppress scattered side lobes in the direction of an illuminating radar substantially independent of azimuth positioning of the illuminating* radar.

14. The vehicle of claim 13 wherein all outwardly projecting intersections formed by adjacent ones of said planar surfaces are of [such] a [relatively] sharp, substantially [nonrounded] *non-rounded* configuration.

15. The vehicle of claim 13 wherein said tail means includes a pair of stabilizers fixed to said fuselage, extending generally upward and converging inward toward one another.

16. The vehicle of claim 15 wherein each of said stabilizers is generally diamond-shaped in cross section.

17. The vehicle of claim 13 wherein said vehicle further comprises at least one engine air inlet, said inlet having an antiradar reflection grid incorporated therein.

18. The vehicle of claim 17 wherein said fuselage has one such air inlet and grid incorporated on either side thereof.

19. The vehicle of claim 13 wherein said vehicle has a planform which is substantially delta-shaped.

20. The vehicle of claim 13 wherein the surfaces of said fuselage converge substantially to a point at the nose portion thereof.

21. The vehicle of claim [13] *14* wherein selected regions of said surfaces and said intersections are coated with radiation absorbing material to further reduce radiation reflectivity of said vehicle.

*22. A vehicle comprising:*

*a body; and*

*a plurality of surfaces defining the exterior of said body, said surfaces comprising a series of facets, said surfaces arranged with high angles of incidence and edge boundaries which suppress scattered side lobes in the direction of an illuminating radar.*

*23. A vehicle comprising:*

*a body; and*

*a plurality of facets defining the exterior of said body, said facets angularly positioned to be least reflective of electromagnetic radiation in a direction of a source of electromagnetic radiation impinging on said facets with none of said facets arranged at a right angle with respect to another facet.*

*24. A vehicle comprising:*

*a body; and*

*said body including a plurality of external surfaces, including individually planar external surfaces, said plurality of external surfaces oriented with high angles of incidence and edge boundaries which suppress scattered side lobes in the direction of an illuminating radar substantially independent of azimuth positioning of the illuminating radar.*

*25. The vehicle according to claims 22, 23 or 24, wherein outwardly protecting intersections formed by adjacent ones of said planar surfaces are of a sharp, substantially non-rounded configuration.*

*26. The vehicle according to claim 25, wherein selected regions of said surfaces and said intersections are coated with a radiation absorbing material to further reduce radiation reflectivity of said vehicle.*

*27. The vehicle according to claim 22, wherein said facets are arranged to concentrate energy primarily into a forward scatter direction.*

*28. The vehicle according to claim 27, comprising:*

*said body having edges exhibiting relatively high radar cross section normal thereto; and*

*said edges oriented and arranged to concentrate scattered energy reflected off said edges primarily into said forward scatter direction.*

*29. The vehicle according to claim 28, comprising:*

*said edges oriented and arranged so that edges having higher radar cross section values are oriented and arranged in sectors where minimum radar cross section is not required.*

*30. The vehicle according to claim 23, wherein said facets are arranged to concentrate energy primarily into a forward scatter direction.*

*31. The vehicle according to claim 30, comprising:*

*said body having edges exhibiting relatively high radar cross section normal thereto; and*

*said edges oriented and arranged to concentrate scattered energy reflected off said edges primarily into said forward scatter direction.*

*32. The vehicle according to claim 31, comprising:*

*said edges oriented and arranged so that edges having higher radar cross section values are oriented and arranged in sectors where minimum radar cross section is not required.*

*33. The vehicle according to claim 24, wherein said external surfaces are arranged to concentrate energy primarily into a forward scatter direction.*

*34. The vehicle according to claim 33, comprising:*

*said body having edges exhibiting relatively high radar cross section normal thereto; and*

*said edges oriented and arranged to concentrate scattered energy reflected off said edges primarily into said forward scatter direction.*

*35. The vehicle according to claim 34, comprising:*

*said edges oriented and arranged so that edges having higher radar cross section values are oriented and arranged in sectors where minimum radar cross section is not required.*

*36. A vehicle comprising:*

*a body; and*

*a plurality of surfaces defining the exterior of said body, said surfaces arranged to concentrate scattered energy*

*reflected off said surfaces primarily in a direction away from a source of the scattered energy substantially independent of azimuth positioning of said source.*

*37. The vehicle according to claim 36, wherein said plurality of surfaces are arranged to concentrate energy primarily into a forward scatter direction.*

*38. The vehicle according to claim 37, comprising:*

*said body having edges exhibiting relatively high radar cross section normal thereto; and*

*said edges are oriented and arranged to concentrate scattered energy reflected off said edges primarily in said direction away from said source.*

*39. The vehicle according to claim 38, wherein said edges are oriented and arranged to concentrate energy primarily into a forward scatter direction.*

*40. The vehicle according to claim 39, comprising:*

*said edges oriented and arranged so that edges having higher radar cross section values are oriented and arranged in sectors where minimum radar cross section is not required.*

*41. The vehicle according to claims 27, 28, 29, 30, 31, 32, 33, 34, 35, 36, 37, 38, 39 or 40, wherein outwardly projecting intersections formed by adjacent ones of said surfaces are of a sharp, substantially non-rounded configuration.*

*42. A method of reducing a radar cross section of a vehicle, comprising:*

*producing said vehicle in a form of a body having a plurality of surfaces, including a plurality of facets, defining the exterior of the vehicle; and*

*arranging said plurality of surfaces with high angles of incidence and edge boundaries which suppress scattered side lobes in a direction of an illuminating radar.*

*43. The method according to claim 42, wherein said arranging step comprises:*

*arranging said plurality of facets to concentrate energy primarily into a forward scatter direction.*

*44. The method according to claim 43, wherein said body has edges exhibiting relatively high radar cross section normal thereto, comprising:*

*orienting and arranging said edges to concentrate scattered energy reflected off said edges primarily into said forward scatter direction.*

*45. The method according to claim 44, wherein step of orienting and arranging said edges comprises:*

*orienting and arranging edges having higher radar cross section values in sectors where minimum radar cross section is not required.*

*46. A method of reducing a radar cross section of a vehicle, comprising:*

*producing said vehicle in a form of a body having a plurality of facets defining the exterior of the body; and*

*angularly positioning the facets to be least reflective of electromagnetic radiation in a direction of a source of electromagnetic radiation impinging on said facets with none of said facets arranged at a right angle with respect to another facet.*

*47. The method according to claim 46, wherein said step of angularly positioning the facets comprises:*

*angularly positioning said facets to concentrate energy primarily into a forward scatter direction.*

*48. The method according to claim 47, wherein said body has edges exhibiting relatively high radar cross section normal thereto, comprising:*

*orienting and arranging said edges to concentrate scattered energy reflected off said edges primarily into said forward scatter direction.*

*49. The method according to claim 48, comprising:*

*orienting and arranging edges having higher radar cross section values in sectors where minimum radar cross section is not required.*

*50. A method of reducing a radar cross section of a vehicle, comprising:*

*producing said vehicle in a form of a body having a plurality of external surfaces, including individually planar external surfaces; and*

*orienting the plurality of external surfaces with high angles of incidence which suppress scattered side lobes in the direction of an illuminating radar substantially independent of azimuth positioning of the illuminating radar.*

*51. The method according to claim 50, wherein said step of orienting the individually planar external surfaces comprises:*

*orienting the individually planar surfaces to concentrate energy primarily into a forward scatter direction.*

*52. The method according to claim 51, wherein said body has edges exhibiting relatively high radar cross section normal thereto, comprising:*

*orienting and arranging said edges to concentrate scattered energy reflected off said edges primarily into said forward scatter direction.*

*53. The method according to claim 52, comprising:*

*orienting and arranging edges having higher radar cross section values in sectors where minimum radar cross section is not required.*

*54. A method of reducing a radar cross section of a vehicle, comprising:*

*producing said vehicle in a form of a body having a plurality of surfaces defining the exterior of the vehicle, and*

*arranging the surfaces to concentrate scattered energy reflected off said surfaces primarily in a direction away from a source of the scattered energy substantially independent of azimuth positioning of said source.*

*55. The method according to claim 54, wherein said step of arranging the surfaces comprises:*

*arranging said surfaces to concentrate energy primarily into a forward scatter direction.*

*56. The method according to claim 55, wherein said body has edges exhibiting relatively high radar cross section normal thereto, comprising:*

*orienting and arranging said edges to concentrate scattered energy reflected off said edges primarily into said forward scatter direction.*

*57. The method according to claim 56, comprising:*

*orienting and arranging edges having higher radar cross section values in sectors where minimum radar cross section is not required.*

*58. The method according to claims 42, 43, 44, 45, 46, 47, 48, 49, 50, 51, 52, 53, 54, 55, 56 or 57, comprising:*

*shaping outwardly projecting intersections formed by adjacent ones of said surfaces to have a sharp, substantially non-rounded configuration.*

*59. The method according to claims 45, 49, 53 or 57, comprising:*

*coating selected regions of said surfaces and said intersections with a radiation absorbing material to further reduce radiation reflectivity of said vehicle.*

* * * * *